United States Patent [19]

Jones

[11] 3,955,124

[45] May 4, 1976

[54] REMOVABLE COULOMETRIC TIMER CONNECTOR ASSEMBLY FOR PRINTED CIRCUIT BOARDS

[75] Inventor: John Paul Jones, Wayne, Pa.

[73] Assignee: Air Products and Chemicals, Inc., Allentown, Pa.

[22] Filed: Feb. 10, 1975

[21] Appl. No.: 548,444

[52] U.S. Cl. .......................... 317/120; 317/101 CC; 339/17 D; 324/94

[51] Int. Cl.[2] ............................................ H02B 1/04

[58] Field of Search ........................ 339/170, 127 R; 174/52 PE; 317/99, 118, 120, 101 CC, 232; 324/94, 182; 248/27

[56] References Cited

UNITED STATES PATENTS

| | | | |
|---|---|---|---|
| 3,029,367 | 4/1962 | Tomonoh | 339/17 D |
| 3,486,998 | 12/1969 | Sellers | 324/94 |
| 3,511,982 | 5/1970 | Salter | 339/17 |
| 3,604,919 | 9/1971 | MacPherson | 339/17 D |
| 3,688,635 | 9/1972 | Fegen | 317/101 CC |
| 3,742,388 | 6/1973 | Finger | 324/94 |
| 3,796,921 | 3/1974 | Fischer | 317/101 CC |
| 3,825,877 | 7/1974 | Ojima | 317/101 CC |

*Primary Examiner*—Gerald P. Tolin
*Attorney, Agent, or Firm*—James C. Simmons; Barry Moyerman

[57] ABSTRACT

For a removable three terminal coulometric timer cell connected in a high voltage circuit, an insulating shell of cylindrical form has radial tabs thereon to receive wire leads from the cell for support of the cell within the shell and for disposal to frictionally connect the leads directly to printed circuit board connector terminals. The tabs are held in compressed condition between an insulation panel and the circuit board and the cell assembly is inserted into a mating hole in the panel keyed with said tabs and rotated to assure good contact between the cell leads and the printed circuit connector terminals.

7 Claims, 5 Drawing Figures

REMOVABLE COULOMETRIC TIMER CONNECTOR ASSEMBLY FOR PRINTED CIRCUIT BOARDS

This invention relates generally to means for removably connecting an electrical device in a printed electric circuit, and more specifically it relates to a printed circuit connector assembly for replaceable coulometric timer cells having conductive outer shell terminals.

BACKGROUND AND PRIOR ART

Three terminal replaceable coulometric cells with known life periods mounted in an outer metallic can as one terminal are known in the art. Such cells at the end of life are destroyed in the manner of a fuse and need to be replaced. Thus, access to the conductive can terminal by a person is necessary, and thus if the cell is mounted in a high voltage circuit, it may present a shock hazard.

Removable connectors of the prior art suitable for use with such coulometric cells have been deficient in several respects. One of the weaknesses of such connectors are requirement for delicate parts, springs, sockets, etc. that are difficult to make and assemble and which lead to limited frictional engagement that may cause poor electrical connections. Also, the complexity and cost of connectors will prevent use of the cell in many applications which otherwise could use successfully a low priced electric timer device.

Wherever circuit conditions require a particular electrical device such as an electrolytic timing cell of unique characteristics it is also desirable to provide a connector which may be easily keyed to prevent insertion of the wrong device.

Complexity introduced by means of intermediate connector parts or soldered connections required by many prior art connectors tends to reduce reliability and increase places for failure to occur. The simplest possible connector device therefore has cost and performance advantages.

OBJECTIVES OF THE INVENTION

It is therefore a general object of the invention to improve the status of the art by correction of one or more of the foregoing deficiencies and problems.

A more specific object of the invention is to provide a safety type removable connector for operation with a high voltage circuit.

Another object of the invention is to provide an improved printed circuit connector.

A further object of the invention is to provide a simple reliable printed circuit connector assembly useful to removably mount a three terminal type coulometric cell.

Other objects, features and advantages of the invention will be found throughout the remaining description.

BRIEF DESCRIPTION OF THE INVENTION

In accordance with this invention therefore, a three terminal type replaceable coulometric cell with two external wire lead anode terminals and a metallic can cathode terminal is used in a high voltage circuit and therefore for safety purposes is placed inside a cylindrical insulating shell having three radial tabs extending at the open end. The tabs are notched at the ends to secure wire leads radially passed therealong at the tab ends by crimping. The radially extending leads themselves form one set of connector terminals, wherein a third wire lead is affixed to the can cathode by soldering or with conducting epoxy which may be placed at the bottom of the shell.

The mating connector is a conventional printed circuit board having printed terminal ends as the mating connector set. The cell assembly is held in place by an apertured insulator panel spaced from the printed circuit board with a shaped aperture having tab shaped keyways to permit entry of the end of the cell assembly between the boards so that it may be rotated for locking in place. The spacing between the boards matching the thickness of the tabs and wires laid thereon holds the connector terminals in firm contact without springs. The tabs may be tapered to produce an entry ramp for simple entry and tightening by rotation of the tabs between the two boards.

The shell casing and aperture in the panel is smaller than a human finger so that there is no danger of shock by contact with the printed circuit terminals to which high voltage is connected, and the wire ends on the cell are placed on the innermost end to be shielded by the insulator panel between the two panels until the leads are disconnected from the high voltage circuit and removed from the aperture. Thus, only the insulator shell is accessible for human contact.

THE DRAWINGS

DETAILED DESCRIPTION

Figure 1:
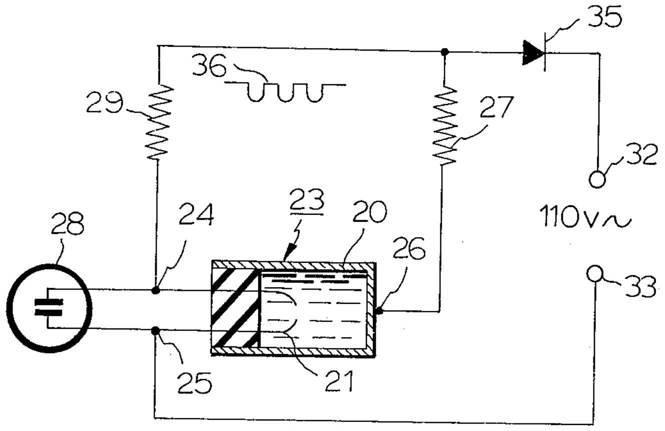
FIG. 1 is a schematic circuit diagram of a typical high voltage circuit configuration using the three terminal type coulometric cell assembly afforded by this invention.

With reference to FIG. 1, a three terminal type coulometric cell 23 is shown having an outer metallic can or casing 20 which provides cathode terminal 26 and from which extends two wire leads to constitute terminals 24, 25 leading to anode 21 in contact with the cell electrolyte solution held inside the cathode can 20. A three terminal coulometric cell of this type like a fuse is destructive and must be replaced in the circuit after the end of a predetermined operating time established by the resistor 27 which limits current flow through the electrolyte that causes deplating of the anode 21 on the inside of the cathode can 20 until the anode wire is ruptured and thus the resistance changes between terminals 24 and 25.

In this circuit embodiment, a light emitting diode 28 connected to terminals 24 and 25 will glow when the anode wire 21 is ruptured by current flow from a potential source (AC or DC) at terminals 32, 33 which typically is 110 volts A.C. When the anode 21 is intact a short circuit appears across the light emitting diode 28 so that it cannot glow. Resistor 29 serves to limit current from the source to a safe operating value for light emitting diode 28. For a-c operation rectifier 35 is provided and the circuit operates from pulsating d-c as shown at waveform 36. From this simple circuit embodiment that is not isolated from line voltage by a transformer it is clear that when the cell 23 need be replaced, a person coming into contact with the cathode can 20 to remove the cell could be in danger of shock from the high voltage appearing at terminals 32 and 33. Accordingly a safe, simple and convenient removable connector assembly is provided as illustrated in the remaining drawing figures.

Figure 2:
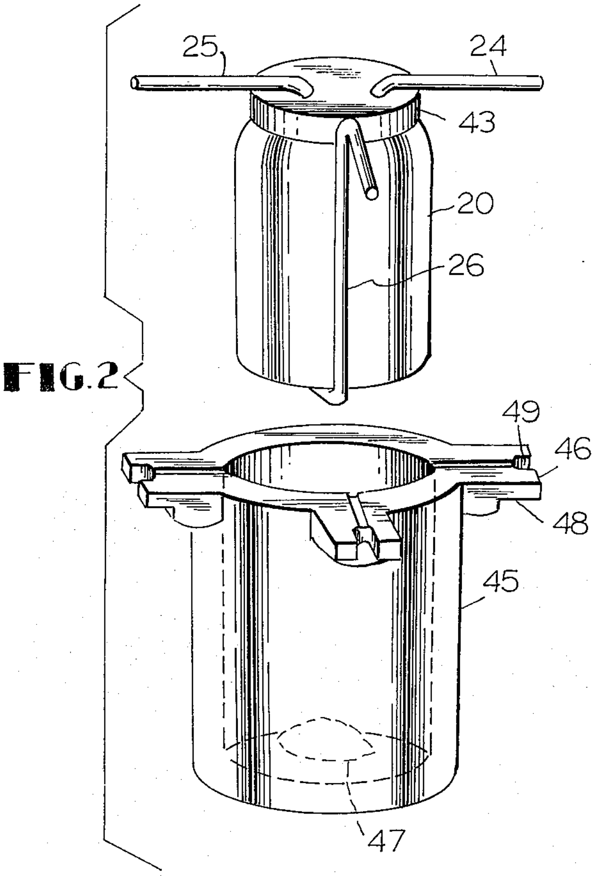
FIG. 2 is an exploded view of a coulometric cell and accompanying outer shell housing.
Figure 3:
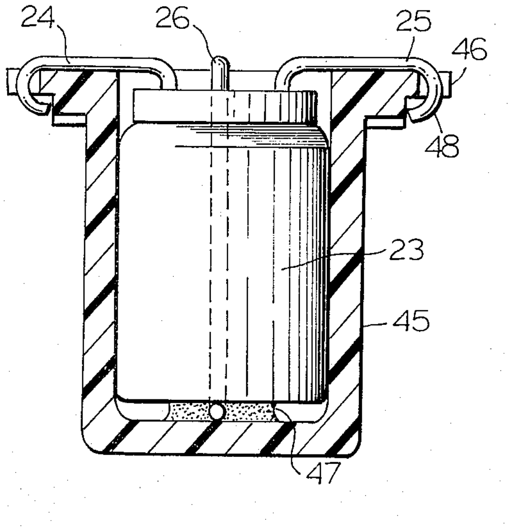
FIG. 3 is an assembled view, partly in section of a cell mounted inside the insulator shell housing.

As shown in FIGS. 2 and 3, the cell cathode can 20 has affixed thereto a wire terminal lead 26 which together with wire terminal leads 24 and 25 extending from insulator plug 43 constitute the three cell terminals to be connected into an electronic timing circuit.

The cell cathode can 20 snugly fits inside insulator shell plastic housing 45 which may have a blob of conducting epoxy 47 on the bottom to serve the dual purpose of affixing the cathode can 20 to the housing shell 45 and to retain terminal wire 26 in electrically conductive contact with the cathode can electrode 20.

At the open end of the cylindrically shaped housing shell 45 are three radially extending tabs 46 each notched at 48 and 49 to receive the respective wire terminal leads 24, 25 and 26 in crimped position with the wires radially disposed and held conductively exposed along the length of the tabs at the open end plane of the housing shell 45. It is seen that the lead wires 24, 25 and 26 may be simply bent or crimped around the end of tab 46 through notch 49 to terminate underside at notch 48. This provides a rugged mount with considerable mechanical strength to withstand connector use, handling and to hold the cell 23 in place without epoxy glue 47 if desired.

Figure 4:
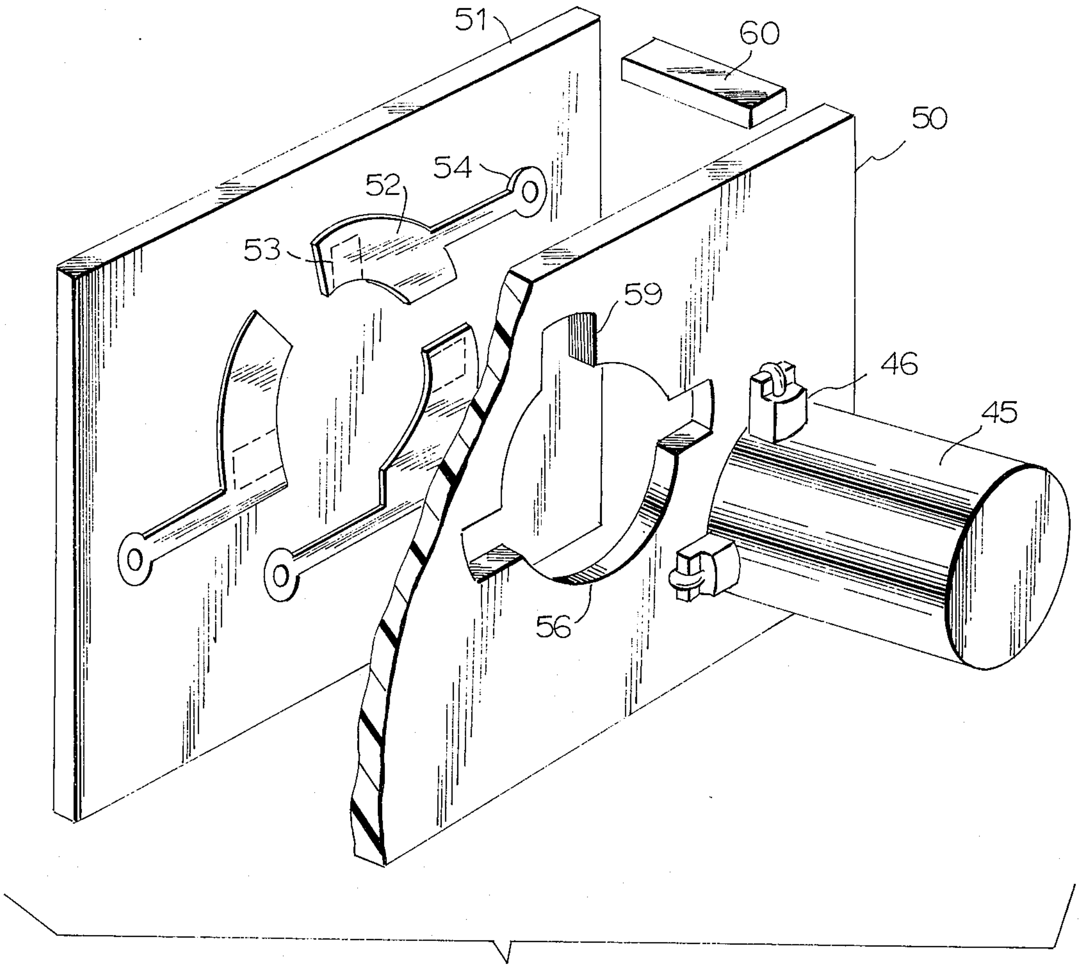
FIG. 4 is a perspective exploded view, partly broken away, of a connector assembly for removably mounting a coulometric cell as afforded by this invention.
Figure 5:
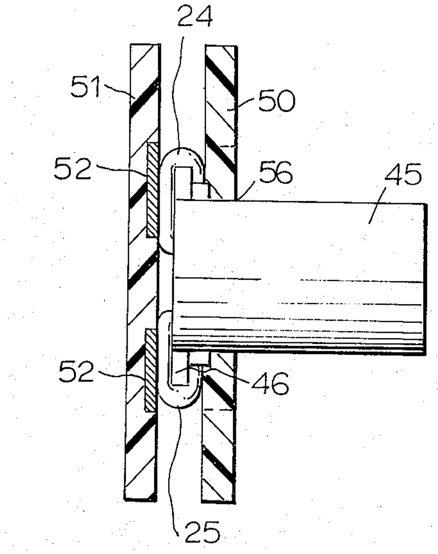
FIG. 5 is an elevation end view of a circuit panel portion, partly in section, showing a mated connector assembly configuration as afforded by this invention.

Use of the cell holder assembly 23, 45 as a removable connector device is shown in FIGS. 4 and 5. A typical printed circuit insulating board 51 has thereon conductive printed terminals 52, 53, 54 connected in a circuit configuration (not shown) such as that of FIG. 1. These printed terminals constitute one set of connector contacts that mate directly with the wires 24, 25 and 26 of the cell which are wound around tab 46.

Spaced from and parallel with printed circuit board 51 is the insulating panel 50 typically held a fixed distance X away by spacer block 60, or the like. The spacing X closely conforms to the thickness of the tab 46 and wire 24, etc. so that the board 51 and panel 50 wedge the tabs therebetween to contact wires 24, etc. firmly into electrical contact with printed circuit terminals 52, 53, etc.

A circular aperture 56 with extending keyways 59 mating with tabs 46 serve to guide the assembly into the circuit position for rotation into locking position. For this purpose the tab 46 may have a ramp on the outermost face as seen in FIG. 4 to facilitate entry of a cell wire 24, etc. into conductive contact at terminal point 53 before rotation into locked wedged-in position 52, for example.

The tabs are both keyways and wedges, and also serve as coding devices for different cell embodiments to assure that they are not inserted into wrong circuit configurations. It is evident that by retaining wires 24, etc. between board 51 and panel 50 in the aperture 56 of smaller size than a human finger, no shock can result in replacing a cell, even if high voltages are present at terminals 54, etc.

Thus, an improved, safe, rugged and simple cell package is provided which serves as its own connector directly to a printed circuit panel, thereby being more reliable than if springs or other connector interfaces were provided.

What is claimed is:

1. Means for removably holding an electrical device in an electric circuit, comprising in combination: an electrical device; a planar printed circuit board having thereon a plurality of conductive terminal ends mating with said electrical device, and a planar insulating panel member parallel to and spaced from said printed circuit board a predetermined distance X said insulating panel member spaced apart from and fastened to said circuit board by a plurality of spacers having a length X equal to the distance X which separates said panel and said board; said panel having defined therein a generally circular aperture in which said electrical device is removably mounted, and said aperture is in registration with said terminal ends with a plurality of keyway slots extending radially therefrom; said electrical device comprising an insulated housing with a generally circular housing configuration terminating at an open end with a plurality of radially extending tabs mating with said keyway slots, said device residing within said housing with wire leads radially extending along the length of said tabs and crimped over the ends thereof, said tabs and said wire leads having a combined maximum thickness slightly exceeding X to thereby permit said tabs to enter said slots and be rotated to extend between said printed circuit board and said panel for frictionally holding said device in place with said wire leads in electrical contact with said terminal ends.

2. The combination defined in claim 1 wherein said tabs comprise ramps that are tapered from a dimension slightly less than X to permit entry between said board and said panel and which have a maximum dimension slightly greater than X to permit frictional tightening in place by rotary movement of said housing.

3. The combination defined in claim 2 wherein said device is a coulometric timing cell, and a high voltage electrical circuit is coupled to said terminal ends on said board.

4. The combination defined in claim 3 wherein said aperture has a dimension small enough to prevent entry of a finger of a person.

5. The combination defined in claim 1 wherein said device has three terminals defined by two wires and a cylindrical metallic can electrode, and a wire is affixed to said can electrode to mate with one of said tabs.

6. The combination defined in claim 5 wherein said device is held in said housing by conducting epoxy material which holds the last said wire in electrically conductive contact with said can electrode.

7. Means for removably holding an electrical device in an electric circuit, comprising in combination:

an electrical device; a planar printed circuit board having thereon a plurality of conductive terminal ends mating with said electrical device, and a planar insulating panel member parallel to and spaced from said printed circuit board a predetermined distance X, said insulating panel member spaced apart from and fastened to said circuit board by a plurality of spacers having a length equal the distance X which separates said panel and said board; said panel having defined therein a generally circular aperture in registration with said terminal ends with a plurality of keyway slots extending radially therefrom;

and said electrical device being removably mounted in said aperture.

* * * * *